United States Patent
Ninomiya et al.

(10) Patent No.: US 12,308,472 B2
(45) Date of Patent: May 20, 2025

(54) SEPARATOR FOR BATTERIES

(71) Applicant: Toray Industries, Inc., Tokyo (JP)

(72) Inventors: Hirokazu Ninomiya, Nasushiobara (JP); Kenji Echizen, Nasushiobara (JP); Kaho Furuyama, Nasushiobara (JP)

(73) Assignee: Toray Industries, Inc., Tokyo (JP)

( * ) Notice: Subject to any disclaimer, the term of this patent is extended or adjusted under 35 U.S.C. 154(b) by 281 days.

(21) Appl. No.: 17/768,689

(22) PCT Filed: Dec. 22, 2020

(86) PCT No.: PCT/JP2020/047877
§ 371 (c)(1),
(2) Date: Apr. 13, 2022

(87) PCT Pub. No.: WO2021/181815
PCT Pub. Date: Sep. 16, 2021

(65) Prior Publication Data
US 2023/0411791 A1 Dec. 21, 2023

(30) Foreign Application Priority Data
Mar. 11, 2020 (JP) .................................. 2020-041549

(51) Int. Cl.
*H01M 50/451* (2021.01)
*H01M 50/417* (2021.01)
*H01M 50/42* (2021.01)
*H01M 50/431* (2021.01)
*H01M 50/443* (2021.01)
*H01M 50/446* (2021.01)
*H01M 50/489* (2021.01)

(52) U.S. Cl.
CPC ....... *H01M 50/451* (2021.01); *H01M 50/417* (2021.01); *H01M 50/42* (2021.01); *H01M 50/431* (2021.01); *H01M 50/443* (2021.01); *H01M 50/446* (2021.01); *H01M 50/489* (2021.01)

(58) Field of Classification Search
None
See application file for complete search history.

(56) References Cited

U.S. PATENT DOCUMENTS

| | | | |
|---|---|---|---|
| 10,312,491 B2 | 6/2019 | Chiba et al. | |
| 2009/0325058 A1* | 12/2009 | Katayama | H01M 50/489 429/142 |
| 2011/0171535 A1* | 7/2011 | Ohinshi | H01M 50/431 977/773 |
| 2011/0176661 A1 | 7/2011 | Li et al. | |
| 2022/0006157 A1* | 1/2022 | Nakazawa | H01M 50/417 |
| 2022/0238928 A1* | 7/2022 | Austin | B60L 53/18 |

FOREIGN PATENT DOCUMENTS

| | | | |
|---|---|---|---|
| JP | 2009-226746 | * | 10/2009 |
| JP | 2015-162313 A | | 9/2015 |
| JP | 5898405 B2 | | 4/2016 |
| JP | 6115602 B2 | | 4/2017 |
| JP | 6337512 B2 | | 6/2018 |
| JP | 6526359 B1 | | 6/2019 |
| WO | 2014/007390 A1 | | 1/2014 |
| WO | WO 2019/103011 | * | 5/2019 |

OTHER PUBLICATIONS

Aramid, available online at https://en.wikipedia.org/wiki/Aramid, date unknown.*
Polyamide, available online at https://en.wikipedia.org/wiki/Polyamide, date unknown.*
Machine translation of JP 2009-226746, published on Oct. 10, 2008 (Year: 2008).*

* cited by examiner

*Primary Examiner* — Anca Eoff
(74) *Attorney, Agent, or Firm* — DLA Piper LLP (US)

(57) ABSTRACT

A battery separator includes a polyolefin porous membrane; and a heat-resistant porous layer provided thereon, wherein the heat-resistant porous layer contains barium sulfate particles and an organic synthetic resin component, the barium sulfate particles contain 20% by volume or less of particles having a diameter of 0.5 μm or less and 10% by volume or less of particles having a diameter of 3.0 μm or more, the heat-resistant porous layer contains 70% by volume or more and 98% by volume or less of the barium sulfate particles when the total of the barium sulfate particles and the organic synthetic resin component is taken as 100% by volume, an average thickness of the heat-resistant porous layer is 2 μm or more and 10 μm or less, a moisture ratio of the separator is 400 ppm or less, and a content of hydrogen sulfide is $0.2 \times 10^{-3}$ mg/m$^2$ or less.

6 Claims, 1 Drawing Sheet

SEPARATOR FOR BATTERIES

CROSS-REFERENCE TO RELATED APPLICATIONS

This application is a National Stage Filing under 37 CFR 371 of the international application No. PCT/JP2020/047877 filed on Dec. 22, 2020, which claims priority to the application No. 2020-041549 filed in Japan on Mar. 11, 2020, each of which is hereby incorporated by reference in its entirety.

TECHNICAL FIELD

This disclosure relates to a battery separator including a polyolefin porous membrane and a heat-resistant porous layer provided on at least one surface of the porous membrane. The battery separator can be usefully used as a separator for a lithium ion secondary battery.

BACKGROUND

Thermoplastic resin porous membranes are widely used as materials for separation, selective permeation, isolation and the like of substances. Examples thereof include a battery separator used for a lithium ion secondary battery, a nickel-hydrogen battery, a nickel-cadmium battery, a polymer battery and the like, a separator for an electric double layer capacitor, various filters such as a reverse osmosis membrane, an ultrafiltration membrane, and a microfiltration membrane, moisture-permeable waterproof clothing, medical materials and the like.

Particularly, as a separator for a lithium ion secondary battery, a polyolefin porous membrane is suitably used that has ion permeability when impregnated with an electrolytic solution, is excellent in electrical insulation properties, electrolytic solution resistance, and oxidation resistance, and also has a pore-blocking effect of cutting off a current at a temperature of about 120 to 150° C. during abnormal temperature rise of the battery and suppressing excessive temperature rise.

However, when the temperature continues to rise even after the pores are blocked for some reason, the polyolefin porous membrane may be broken. This phenomenon is not limited to using polyolefin and cannot be avoided at a temperature equal to or higher than the melting point of the resin constituting the porous membrane.

In particular, the separator for a lithium ion secondary battery is deeply related to battery characteristics, battery producibility, and battery safety and is required to have excellent mechanical characteristics, heat resistance, permeability, dimensional stability, pore-blocking characteristics (shutdown characteristics), melt-fracture characteristics (melt-down characteristics) and the like. In recent years, particularly when used in a lithium ion battery for in-vehicle use, it is necessary to shorten the charging time of the battery and improve the acceleration performance, and rapid charge (large current charge) and increase in power consumption (large current discharge) are required as required characteristics of the battery. Accordingly, improvement of output characteristics has been further enhanced as a requirement for the separator. Therefore, studies have been made on laminating various modified porous layers on a porous membrane.

As the modified porous layer, for example, a polyamide-imide resin having both heat resistance and electrolyte permeability, a polyimide resin, a polyamide resin, and/or a fluororesin excellent in electrode adhesiveness is suitably used. In addition, water-soluble or water-dispersible binders that enables lamination of a modified porous layer using a relatively simple water washing and drying steps are also widely used. The modified porous layer refers to a layer containing a resin that imparts or improves at least one of functions such as heat resistance, adhesiveness to an electrode material, high ion permeability, and high-output characteristics.

Example 1 of Japanese Patent No. 6337512 discloses a separator in which heat resistance and stability of a battery are improved by coating a 12 μm-thick polyethylene separator with a slurry containing barium sulfate particles and poly(meth)acrylamide by gravure coating.

Japanese Patent No. 5898405 discloses a separator that contains 2 to 20 parts by weight of barium sulfate per 100 parts by weight of a microporous membrane, thereby making it possible to detect relative positions of an electrode and the separator in X-ray inspection.

Example 1 of Japanese Patent No. 6526359 discloses a separator formed by dissolving a polyvinylidene fluoride resin (VDF-HFP copolymer, VDF:HFP (molar ratio)=97.6:2.4, weight average molecular weight 1.13 million) in a mixed solvent of dimethylacetamide (DMAc) and tripropylene glycol (TPG) (DMAc:TPG=80:20 [mass ratio]) to have a resin concentration of 4% by mass, further mixing barium sulfate particles (average primary particle size: 0.10 μm) with stirring, and applying the resulting coating liquid to a polyethylene microporous membrane.

Japanese Patent No. 6115602 discloses a separator in which the average particle size D20 of inorganic particles is made larger than the average pore size of pores opened on the surface of a microporous membrane so that the inorganic particles do not enter the pores on the surface of the microporous membrane to inhibit the pores from being crushed, and both high ion permeability and pressure resistance are achieved.

A battery separator is a member for insulating the flow of electrons when the temperature of a lithium secondary battery abnormally rises, and a heat-resistant porous layer is required to have higher heat resistance to improve the safety of the battery. To improve heat resistance, inorganic particles may be blended in addition to the heat-resistant resin, and shrinkage of the separator due to heat can be further suppressed. However, as the ratio of the inorganic particles in the heat-resistant porous layer increases, gaps between the particles become narrow, and air resistance and electrical resistance increase so that there is a problem that output characteristics deteriorate.

In addition, the lithium ion secondary battery contains an electrolyte that is important for a battery reaction and reacts very sensitively to water, and generation of gas such as hydrogen fluoride or deterioration of battery performance due to consumption of the electrolyte may be caused. When boehmite contained as inorganic particles in a modified porous layer of a general battery separator is taken as an example, boehmite contains water molecules in the structure and has many hydroxy groups on the particle surface, and boehmite therefore has a property of adsorbing a large amount of moisture by forming hydrogen bonds with moisture in the air. The modified porous layer similarly contains moisture and reacts with the electrolyte when coming into contact with the electrolytic solution in the battery, thereby causing generation of gas such as hydrofluoric acid and deterioration of battery performance. JP '512 proposes to use a mixture of a specific barium sulfate and a specific synthetic resin, but it is not sufficient because gas may be generated.

It could therefore be helpful to provide a battery separator having low air resistance, low electrical resistance, excellent high-output characteristics, and low moisture content ratio and showing suppressed gas generation.

SUMMARY

We thus provide:
a battery separator including a polyolefin porous membrane and a heat-resistant porous layer provided on at least one surface of the porous membrane,
the heat-resistant porous layer containing barium sulfate particles and an organic synthetic resin component,
the barium sulfate particles containing 20% by volume or less of particles having a particle diameter of 0.5 μm or less and 10% by volume or less of particles having a particle diameter of 3.0 μm or more,
the barium sulfate particles contained in an amount of 70% by volume or more and 98% by volume or less when the total of the barium sulfate particles and the organic synthetic resin component is taken as 100% by volume,
the average thickness of the heat-resistant porous layer being 2 μm or more and 10 μm or less,
the moisture ratio of the separator being 400 ppm or less, and
the content of hydrogen sulfide being $0.2 \times 10^{-3}$ mg/m$^2$ or less.
Preferably,
(1) the barium sulfate particles are precipitated barium sulfate,
(2) the precipitated barium sulfate is produced by the mirabilite method using barium chloride as a raw material,
(3) the barium sulfate particles have a BET specific surface area of 2.0 m$^2$/g or more and less than 3.0 m$^2$/g,
(4) the organic synthetic component contains one or more selected from the group consisting of a (meth)acrylate copolymer resin, a polyacrylamide resin, a polyvinylidene fluoride resin, a polyvinyl alcohol resin, a polyimide resin, a polyamideimide resin, a polyamide resin, and a poly(meth)aramid resin, and
(5) the polyolefin porous membrane has an air resistance of 30 sec/100 cm$^3$ Air or more and 200 sec/100 cm$^3$ or less.

Our battery separator thus has low air resistance, low electrical resistance, good high-output characteristics, and low moisture content ratio and showing suppressed hydrogen sulfide gas generation.

DETAILED DESCRIPTION

Figure 1:
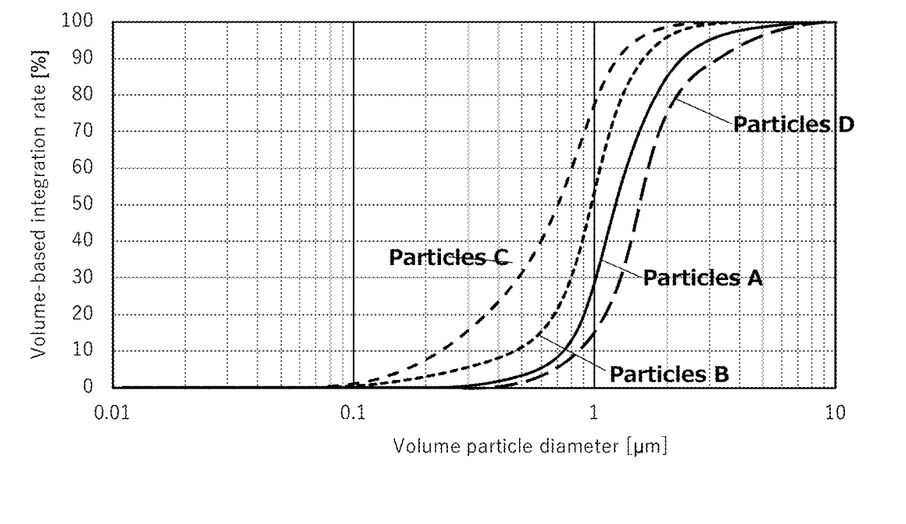
The Drawing is a graph showing volume-based cumulative fractions of particles A, B, C, and D used in examples and comparative examples.

Examples of our battery separators will be described below in detail. This disclosure is nonetheless not limited to the examples described below.

Our battery separators include a polyolefin porous membrane and a heat-resistant porous layer provided on at least one surface of the porous membrane.

Polyolefin Porous Membrane

The thickness of the polyolefin porous membrane is not particularly limited as long as it has the function of a battery separator but is preferably 25 μm or less. The thickness is more preferably 7 μm or more and 20 μm or less, still more preferably 9 μm or more and 16 μm or less. When the thickness of the polyolefin porous membrane is 25 μm or less, it is possible to achieve both practical membrane strength and the pore-blocking function, the area per unit capacity of the battery case is not restricted, and it is suitable for increasing the battery capacity.

The air resistance of the polyolefin porous membrane is preferably 30 sec/100 cm$^3$ Air or more and 200 sec/100 cm$^3$ Air or less. The air resistance is more preferably 40 sec/100 cm$^3$ Air or more and 150 sec/100 cm$^3$ Air or less, still more preferably 50 sec/100 cm$^3$ Air or more and 100 sec/100 cm$^3$ Air or less. When the air resistance is 30 sec/100 cm$^3$ Air or more, sufficient mechanical strength and insulation properties are obtained so that the possibility that a short circuit occurs during charging and discharging of the battery is reduced. When it is 200 sec/100 cm$^3$ Air or less, sufficient charge/discharge characteristics of the battery, particularly ion permeability (charge/discharge operating voltage) and battery life (closely related to the holding amount of the electrolytic solution) are obtained, and the function as a battery can be sufficiently exhibited.

The porosity of the polyolefin porous membrane is preferably 20% or more and 70% or less. It is more preferably 30% or more and 60% or less, still more preferably 55% or less. When the porosity is 30% or more and 70% or less, sufficient charge/discharge characteristics of the battery, particularly ion permeability (charge/discharge operating voltage) and battery life (closely related to the holding amount of the electrolytic solution) are obtained, and the function as a battery can be sufficiently exhibited so that the possibility that a short circuit occurs during charge/discharge is reduced because sufficient mechanical strength and insulation properties are obtained.

The average pore size of the polyolefin porous membrane is preferably 0.01 μm or more and 1.0 μm or less because it greatly affects the pore-blocking performance. The average pore size is more preferably 0.02 μm or more and 0.5 μm or less, still more preferably 0.03 μm or more and 0.3 μm or less. When the average pore size of the polyolefin porous membrane is less than 0.01 μm, clogging of pores due to an organic synthetic component may occur when the heat-resistant porous layer is deposited, and air resistance and electrical resistance may be deteriorated. When the thickness is 1 μm or more, pores are clogged with the heat-resistant porous layer composition so that air resistance and electrical resistance may be deteriorated, or safety of the battery may be deteriorated due to occurrence of a slight short circuit.

When the average pore size of the polyolefin porous membrane is 0.01 μm or more and 1.0 μm or less, sufficient adhesion strength of the heat-resistant porous layer to the polyolefin porous membrane is obtained due to the anchor effect of the binder, air resistance and electrical resistance are not significantly deteriorated when the heat-resistant porous layer is laminated, the response to the temperature of the pore-blocking phenomenon is not slowed, and a shift of the pore-blocking temperature due to a change in the rate of temperature rise to a higher temperature side is less likely to be observed. The average pore size is a measured value obtained by a bubble point method defined in JIS K 3832: 1990.

The polyolefin resin constituting the polyolefin porous membrane is not particularly limited, but polyethylene or polypropylene is preferable. The polyolefin resin may be a single product or a mixture of two or more different polyolefin resins such as a mixture of polyethylene and polypropylene, or a copolymer of different olefins. This is because, in addition to basic characteristics such as electrical insulation properties and ion permeability, a pore-blocking effect of cutting off the current and suppressing excessive temperature rise at the time of abnormal temperature rise of the battery can be imparted.

Among them, polyethylene is particularly preferable from the viewpoint of excellent pore-blocking performance. Detailed descriptions will be made taking polyethylene as an example of the polyolefin resin used, but the examples are not limited thereto.

Examples of polyethylene include ultrahigh molecular weight polyethylene, high density polyethylene, medium density polyethylene, and low density polyethylene. The polymerization catalyst is not particularly limited, and examples thereof include Ziegler-Natta catalysts, Phillips catalysts, and metallocene catalysts. These polyethylenes may be not only homopolymers of ethylene but also copolymers containing a small amount of other α-olefins. Suitable examples of the α-olefin other than ethylene include propylene, 1-butene, 1-pentene, 1-hexene, 4-methyl-1-pentene, 1-octene, (meth)acrylic acid, an ester of (meth)acrylic acid, and styrene.

The polyethylene may be a single product but is preferably a mixture of two or more kinds of polyethylene. As the polyethylene mixture, a mixture of two or more kinds of ultrahigh molecular weight polyethylenes having different weight average molecular weights (Mw) or a similar mixture of high density polyethylenes, medium density polyethylenes, or low density polyethylenes may be used, or a mixture of two or more kinds of polyethylenes selected from the group consisting of ultrahigh molecular weight polyethylenes, high density polyethylenes, medium density polyethylenes, and low density polyethylenes may be used.

The polyolefin porous membrane has a function of blocking pores when a charge-discharge reaction is abnormal. Therefore, the melting point (softening point) of the constituent resin is preferably 70° C. or higher and 150° C. or lower. The melting point is more preferably 80° C. or higher and 140° C. or lower, still more preferably 100° C. or higher and 130° C. or lower. When the melting point of the constituent resin is 70° C. or higher and 150° C. or lower, the battery will not become unusable because the pore-blocking function is not exhibited during normal use, and the hole-blocking function is exhibited during abnormal reaction so that safety can be secured.

Heat-Resistant Porous Layer

The battery separator includes a heat-resistant porous layer provided on at least one surface of the polyolefin porous membrane and contains barium sulfate particles and an organic synthetic resin component.

The heat-resistant porous layer may be provided on only one surface or both surfaces of the polyolefin porous membrane. When the heat-resistant porous layer is provided only on one surface, the number of steps for forming the heat-resistant porous layer is reduced so that the production cost can be further reduced. When the heat-resistant porous layer is provided on both surfaces, shrinkage of the polyolefin porous membrane due to heat is suppressed from both surfaces so that shrinkage of the battery separator due to heat can be more effectively reduced.

Barium Sulfate Particles

The barium sulfate particles contain 20% by volume or less of particles having a particle diameter of 0.5 μm or less and 10% by volume or less of particles having a particle diameter of 3.0 μm or more. It is preferable that the content of particles having a particle diameter of 0.5 μm or less be 15% by volume or less and that the content of particles having a particle diameter of 3.0 μm or more be 8% by volume or less, and it is more preferable that the content of particles having a particle diameter of 0.5 μm or less be 10% by volume or less and that the content of particles having a particle diameter of 3.0 μm or more be 6% by volume or less. When the content of particles having a particle diameter of 0.5 μm or less is more than 20% by volume, gaps between inorganic particles in the heat-resistant porous layer are filled up, a movement path of lithium ions inside the battery is narrowed or lengthened to increase film resistance, and pores of the polyolefin porous membrane are clogged with particles so that performance of the battery may be significantly deteriorated. When the content of particles having a particle diameter of 3.0 μm or more is more than 10% by volume, the structure of the heat-resistant porous layer becomes brittle because the number of contact points between individual inorganic particles in the heat-resistant porous layer is reduced. It becomes difficult to suppress shrinkage of the polyolefin porous membrane at a high temperature, or the number of coarse particles increases so that the surface shape of the heat-resistant porous layer can be uneven, and streaks and the like may be generated in the method of producing a heat-resistant porous layer described later. When the content of particles having a particle diameter of 0.5 μm or less is 20% by volume or less, and the content of particles having a particle diameter of 3.0 μm or more is 10% by volume or less, the gaps between the inorganic particles of the heat-resistant porous layer are not filled up, and the pores of the polyolefin porous membrane are less likely to be clogged with the particles so that the membrane resistance can be reduced.

The "particle diameter" refers to a particle diameter when a cumulative curve is obtained with the total volume as 100% when measured using a laser diffraction particle size distribution analyzer. In addition, the average particle diameter of the barium sulfate particles is defined as the particle diameter when the volume-average particle diameter (μm) =volume-based integration rate was 50% when measured using a laser diffraction particle size distribution analyzer (LA-960V2 manufactured by HORIBA, Ltd.) according to JIS Z 8825 (2013).

The barium sulfate particles are produced by a synthetic method. Specifically, they are barium sulfate particles obtained by a method (sulfuric acid method) of obtaining barium sulfate by adding sulfuric acid to barium carbonate or barium sulfide or a method (mirabilite method) of obtaining barium sulfate by adding sodium sulfate to barium chloride.

The barium sulfate particles increase the cost, but it is preferable to use precipitated barium sulfate particles obtained by a synthesis method, in particular, barium sulfate particles synthesized by the mirabilite method in which barium chloride is used as a starting material and allowed to react with sodium sulfate (mirabilite). This is because the barium sulfate particles synthesized by the mirabilite method generate extremely little hydrogen sulfide in the course of examining the barium sulfate particles so that generation of corrosive gas can be suppressed.

The shape of the barium sulfate particles is not particularly limited, and barium sulfate particles having various shapes can be used. Specific examples thereof include a perfect spherical shape, a substantially spherical shape, a plate shape, a needle shape, and a polyhedral shape, and any shape may be used.

Organic Synthetic Resin Component

The organic synthetic resin component has both an effect of binding the barium sulfate particles constituting the heat-resistant porous layer to each other and an effect of bringing the heat-resistant porous layer into close contact with the polyolefin porous membrane.

Specifically, one or more selected from the group consisting of a (meth)acrylate copolymer resin, a polyacrylamide resin, a polyvinylidene fluoride resin, a polyvinyl alcohol resin, a polyimide resin, a polyamideimide resin, a polyamide resin, and a poly(meth)aramid resin can be used, and commercially available aqueous solutions or aqueous dispersions can be used. Specific examples of the acrylic resin include "Polysol" series manufactured by Showa Denko K.K., "BM" series manufactured by Zeon Corporation, "JURYMER" (registered trademark) AT-210 and ET-410 and "ARON" (registered trademark) A-104, AS-2000, and NW-7060 manufactured by Toagosei Co., Ltd., "LIOACCUM" (registered trademark) series manufactured by Toyochem Co., Ltd., TRD202A and TRD102A manufactured by JSR Corporation, "Polystron" (registered trademark) 117, 705, and 1280 manufactured by Arakawa Chemical Industries, Ltd., "Cogum" (registered trademark) series manufactured by Showa Denko K.K., and WEM-200U and WEM-3000 manufactured by Taisei Fine Chemical Co., Ltd. Specific examples of the polyvinyl alcohol include "Kuraray Poval" (registered trademark) 3-98 and 3-88 manufactured by Kuraray Co., Ltd., and "GOHSENOL" (registered trademark) N-300 and GH-20 manufactured by Mitsubishi Chemical Corporation. Among them, an acrylic resin having high versatility and easily binding barium sulfate particles to each other is preferable.

The heat-resistant porous layer may appropriately contain a thickener, a wetting agent and the like for the purpose of improving coatability and a thermosetting resin, a crosslinking agent and the like for the purpose of improving heat resistance.

Volume Composition Ratio of Heat-Resistant Porous Layer

The content of the barium sulfate particles contained in the heat-resistant porous layer is 70% by volume or more and 98% by volume or less where the total of the barium sulfate particles and the organic synthetic resin component is 100% by volume. The content is more preferably 77% by volume or more and 93% by volume or less, still more preferably 85% by volume or more and 90% by volume or less.

When the content of the barium sulfate particles is less than 70% by volume, gaps between individual barium sulfate particles in the heat-resistant porous layer are clogged with the organic synthetic resin component so that the movement path of ions is narrowed or lengthened, thereby increasing electrical resistance and air resistance.

When the content of the barium sulfate particles is more than 98% by volume, the amount of the organic synthetic resin component connecting the individual barium sulfate particles is insufficient, and the structure as the heat-resistant porous layer cannot be maintained.

When the content of the barium sulfate particles is 70% by volume or more and 98% by volume or less, the gaps between the individual barium sulfate particles in the heat-resistant porous layer are less likely to be clogged with the organic synthetic resin component, favorable electrical resistance and air resistance can be obtained, and the amount of the binder that holds the barium sulfate particles together does not become insufficient so that shrinkage of the polyolefin porous membrane due to heat can be suppressed.

Average Thickness of Heat-Resistant Porous Layer

The average thickness of the heat-resistant porous layer is preferably 2.0 μm or more and 10 μm or less. The average thickness is more preferably 2.5 μm or more and 6 μm or less, still more preferably 3.0 μm or more and 4.0 μm or less. When the thickness of the heat-resistant porous layer is less than 2.0 μm, shrinkage of the polyolefin porous membrane due to heat may not be suppressed. When the average thickness of the heat-resistant porous layer is more than 10 μm, the movement path of ions becomes long, the air resistance thus increases, or the electrical resistance may increase because the ratio of the battery separator to the battery cell capacity increases due to increase in the distance between the positive electrode and the negative electrode of the battery cell. When the average thickness of the heat-resistant porous layer is 2.0 μm or more and 10 μm or less, the air resistance hardly increases, and the electrical resistance hardly increases.

Moisture Ratio of Barium Sulfate

Since the barium sulfate particles do not have hydroxy groups on the particle surface, the influence of water molecules adsorbed on the surface is small, and generation of gas such as hydrofluoric acid generated by the reaction between water and the electrolytic solution and deterioration of battery characteristics due to consumption of the electrolytic solution can be suppressed. The specific surface area of the barium sulfate particles is preferably 1.0 m$^2$/g or more and 18.0 m$^2$/g or less. The specific surface area is more preferably 2.0 m$^2$/g or more and 12.0 m$^2$/g or less, still more preferably 2.0 m$^2$/g or more and 3.0 m$^2$/g or less.

When the specific surface area of the barium sulfate particles is less than 1.0 m$^2$/g, the particle size of each barium sulfate particle in the heat-resistant porous layer may be larger than the thickness of the heat-resistant porous layer. Hence, the barium sulfate particles may fall off from the battery separator, or the ratio of the separator to the battery cell capacity increases because the distance between the positive electrode and the negative electrode of the battery cell increases so that the battery capacity density may decrease. When the specific surface area of the barium sulfate particles is more than 18.0 m$^2$/g, the amount of moisture adsorbed on the surfaces of the barium sulfate particles increases, and the moisture ratio of the battery separator may increase. When the specific surface area of the barium sulfate particles is 1.0 m$^2$/g or more and 18.0 m$^2$/g or less, the barium sulfate particles do not fall off, the capacity density of the battery does not decrease, and the moisture ratio of the battery separator does not increase, which is preferable. The moisture ratio referred to herein is a value obtained by connecting a Karl Fischer moisture meter (MKC-610 manufactured by Kyoto Electronics Manufacturing Co., Ltd.) and a moisture vaporizer (ADP-611 manufactured by Kyoto Electronics Manufacturing Co., Ltd.) placed in a dry box under an atmosphere at a dew point of −60° C. with a gas pipe, leaving 1 g of a battery separator still under an atmosphere at a dew point of −60° C. for 24 hours, and then heating the battery separator with the moisture vaporizer under a nitrogen atmosphere at a temperature of 150° C. for 10 minutes to measure the moisture contained in the gas flowing out from the gas pipe to the Karl Fischer moisture meter.

Content of Hydrogen Sulfide

Hydrogen sulfide contained in the battery separator is 0.2×10$^{-3}$ mg/m$^2$ or less. It is preferably 0.15×10$^{-3}$ mg/m$^2$ or less, more preferably 0.1×10$^{-3}$ mg/m$^2$ or less. When it is more than $0.2 \times 10^{-3}$ mg/m$^2$, gas is generated inside the battery cell, or the current collector is deteriorated due to an oxidation reaction of the current collector of the electrode and hydrogen sulfide so that the life of the battery may be reduced. When the content is $0.2 \times 10^{-3}$ mg/m$^2$ or less, generation of gas in the battery cell can be suppressed, and deterioration of the current collector of the electrode can be suppressed. The content of hydrogen sulfide is determined in the following manner: 5 m$^2$ of the battery separator was enclosed in a sealed container having a capacity of 1 L, the battery separator was allowed to stand in an atmosphere at 60° C. for 24 hours, a measurement value of the gas in the container obtained by a gas detector tube method as specified in JIS K 0804:2014 was defined as X [ppm by volume], and the amount of hydrogen sulfide contained per unit area of the separator [mg/m$^2$] was calculated by the following calculation:

$$\text{Hydrogen sulfide content [mg/m}^2\text{]} = \frac{\text{Capacity of sealed container [L]} \times (\text{value measured with gas detection tube [ppm by volume]}) \times (\text{gas density of hydrogen sulfide [g/L]})}{\text{Area of separator enclosed in sealed container [m}^2\text{]}} \times 10^{-3}$$

A gas density of hydrogen sulfide of 1.5392 [g/L] (1 atom, 0° C.; "Chemical Engineering Handbook," revised seventh edition, Maruzen Publishing Co., Ltd.) was used.

The method of adjusting the amount of hydrogen sulfide contained in the battery separator generated per 1 m$^2$ of the battery separator to $0.2 \times 10^{-3}$ mg/m$^2$ or less is not particularly limited but may be, for example, a method in which barium sulfate produced by a sulfuric acid method among precipitated barium sulfate is heat-treated or a method in which washing with sufficient water and drying are performed. The battery separator can be obtained by appropriately subjecting the battery separator to a heat treatment even when hydrogen sulfide contained in the battery separator is more than $0.2 \times 10^{-3}$ mg/m$^2$.

Next, a method of manufacturing our separators will be specifically described.

Method of Forming Heat-Resistant Porous Layer

The heat-resistant porous layer can be obtained by the following steps:
(a) preparing a heat-resistant porous layer coating dispersion,
(b) coating at least one surface or both surfaces of the polyolefin porous membrane with the slurry, and
(c) after the coating, evaporating the solvent with a dryer to form a heat-resistant porous layer.

As a method of coating at least one surface or both surfaces of the polyolefin porous membrane with the heat-resistant porous layer coating dispersion in the step (b), a known method can be used. Examples thereof include a reverse roll coating method, a gravure coating method, a small-diameter gravure coater method, a kiss coating method, a roll brush method, an air knife coating method, a Meyer bar coating method, a pipe doctor method, a blade coating method, and a die coating method, and these methods can be used alone or in combination.

The battery separator can be used as a battery separator for a secondary battery such as a nickel-hydrogen battery, a nickel-cadmium battery, a nickel-zinc battery, a silver-zinc battery, a lithium ion secondary battery, a lithium polymer secondary battery, and a lithium-sulfur battery. In particular, the separator is preferably used as a separator of a lithium ion secondary battery.

EXAMPLES

Our battery separators will be specifically described below with reference to examples, but this disclosure is not limited by the examples. The measured values in the examples are values obtained by the following methods.

1. Air Resistance (sec/100 cm$^3$ Air)

Using an Oken type air resistance meter (EGO-1T manufactured by ASAHI SEIKO CO., LTD.), a sample of each of the polyolefin porous membrane and the battery separator was fixed not to be wrinkled, and measurement was performed according to JIS P 8117. The sample was 100 mm square, the measurement points were 5 points in total including the central portion and 4 corners of the sample, and the average value thereof was used as the air resistance (sec/100 cm$^3$ Air). When the length of one side of the sample was less than 100 mm, values measured at 5 points at intervals of 50 mm may be used.

2. Thickness (μm)

The thickness of each of the polyolefin porous membrane and the battery separator was determined by averaging measured values at 5 points using a contact type thickness gauge ("LITEMATIC" (registered trademark) series 318 manufactured by Mitutoyo Corporation). Measurement was performed under the condition of a load of 0.01 N using an ultra-hard spherical surface gauge head with a diameter of 9.5 mm. Further, the thickness (μm) of the heat-resistant porous layer was obtained by washing the battery separator with the same liquid as the solvent contained in the slurry, measuring the polyolefin porous membrane from which the heat-resistant porous layer had been removed with the contact type thickness gauge, and calculating the thickness by the following calculation formula:

Thickness (μm) of heat-resistant porous layer=thickness (μm) of battery separator−thickness (μm) of polyolefin porous membrane.

3. Particle Diameter (μm)

For the particle diameter of the barium sulfate particles, the following physical property values were measured using a laser diffraction particle size distribution analyzer (LA-960V2 manufactured by HORIBA, Ltd.) according to JIS Z 8825 (2013):
1) Volume average particle diameter (μm)=particle diameter when volume-based integration rate was 50%
2) Content (%) of particles of 0.5 μm or less=(volume-based integration rate of 0.5 μm or less)×100
3) Content (%) of particles of 3.0 μm or more={1−(volume-based integration rate of 3.0 μm or less)}×100.

4. Content of Hydrogen Sulfide

According to the method of measuring the content of hydrogen sulfide, measurement was carried out three times using a Kitagawa type detector (AP-20 manufactured by KOMYO RIKAGAKU KOGYO K.K.) and a hydrogen sulfide detection tube (120U manufactured by KOMYO RIKAGAKU KOGYO K.K.), and the average value thereof was used to calculate the hydrogen sulfide content per 1 m$^2$ of the battery separator. When the measured value using the gas detection tube was equal to or less than the lower detection limit, the average value and the hydrogen sulfide content were calculated using the lower detection limit.

5. Moisture Ratio (Ppm by Weight)

The moisture ratio was obtained by connecting a Karl Fischer moisture meter (MKC-610 manufactured by Kyoto Electronics Manufacturing Co., Ltd.) and a moisture vaporizer (ADP-611 manufactured by Kyoto Electronics Manufacturing Co., Ltd.) placed in a dry box under an atmosphere at a dew point of −60° C. with a gas pipe, leaving 1 g of a battery separator still under an atmosphere at a dew point of −60° C. for 24 hours, and then heating the battery separator with the moisture vaporizer under a nitrogen atmosphere at a temperature of 150° C. for minutes to measure the moisture contained in the gas flowing out from the gas pipe to the Karl Fischer moisture meter.

6. Electrical Resistance

The electrical resistance of the battery separator was measured by the following method. CR2032 coin cells were prepared so that the number of battery separators was three, four, and five, respectively. Specifically, a cut-out battery separator is impregnated with an electrolytic solution (1 M-LiPF6/EC:EMC (4:6% by volume)). The product was sealed in a coin-shaped case under reduced pressure to produce a cell. The cell was placed in a thermostatic bath at 25° C., and the resistance of the cell was measured at an amplitude of 20 mV and a frequency of 200 kHz by an AC impedance method. The measured resistance value of the cell was plotted with respect to the number of battery separators, and this plot was linearly approximated to obtain a slope. This slope was multiplied by the measurement area to determine the electrical resistance (ohm·cm$^2$) per battery separator.

7. Thermal Shrinkage (%)

The heat resistance of the battery separator was measured in the MD direction (longitudinal direction) and the TD direction (transverse direction) of the battery separator by the following method. The detailed procedure will be described below.

1) Three battery separators each having a size of 100 mm×100 mm are cut out, a transparent glass scale (measurement accuracy: 0.1 mm) is placed on the separators, and distances between midpoints of two sides facing each other of each battery separators are measured as a length in the MD direction and a length in the TD direction and defined as initial dimensions (mm).

2) The battery separator was sandwiched between two sheets of A3 paper, placed in an oven at a temperature of 130° C., and allowed to stand for 1 hour. Thereafter, the battery separator was taken out and allowed to cool for 30 minutes.

3) Each distance between the midpoints of two facing sides of the battery separator was measured again on the glass scale and taken as the dimension (mm) after shrinkage. The measurement position at this time was the same position as the position where the initial dimension was measured, and when the end of the battery separator was curled, the measurement was carried out after spreading the battery separator. Using the obtained initial dimensions and the dimensions after shrinkage, the length in the MD direction, the length in the TD direction, and the thermal shrinkage (%) of each were obtained by the following calculation formula:

Thermal shrinkage (%)={initial dimension (mm)−dimension after shrinkage (mm)}/initial dimension (mm)×100.

8. Physical Properties of Battery Cell

Production of Positive Electrode

An NMP solution containing 1.2 parts by mass of PVDF as a binder was added to and mixed with 97 parts by mass of lithium cobaltate as an active material and 1.8 parts by mass of carbon black to provide a positive electrode mixture-containing slurry. The positive electrode mixture-containing slurry was uniformly applied to both surfaces of a positive electrode current collector made of an aluminum foil having a thickness of 20 μm and dried to form a positive electrode layer, and then the product was compression-molded with a roll press machine to adjust the density of the positive electrode layer excluding the current collector to 3.6 g/cm$^3$, thereby producing a positive electrode.

Production of Negative Electrode

An aqueous solution containing 1.0 part by mass of sodium carboxymethylcellulose was added to and mixed with 98 parts by mass of artificial graphite as an active material, and 1.0 part by mass of a styrene butadiene latex as a solid content and a binder was further added thereto and mixed to provide a negative electrode mixture-containing slurry. The negative electrode mixture-containing slurry was uniformly applied to both surfaces of a negative electrode current collector made of a copper foil having a thickness of 10 μm and dried to form a negative electrode layer, and then the product was compression-molded with a roll press machine to adjust the density of the negative electrode layer excluding the current collector to 1.45 g/cm$^3$, thereby producing a negative electrode.

Production of Test Battery

A wound body was produced using the positive electrode and the negative electrode equipped with tabs and each microporous membrane. Next, the wound body was placed in an aluminum laminated bag, an electrolytic solution (1.1 mol/L, LiPF6, ethylene carbonate/ethylmethyl carbonate/diethylene carbonate=3/5/2 (volume ratio) to which 0.5 wt % of vinylene carbonate and 2 wt % of fluoroethylene carbonate were added) was dropped, and the bag was sealed with a vacuum laminator. Then, charging was performed to 10% of the total capacity at 0.2 C (C represents a current value at which the battery can be fully charged in 1 hour and is 300 mA), and immediately after opening one side of the laminate for degassing, the laminate was sealed again with a vacuum sealer.

Subsequently, the battery was charged at a constant current and a constant voltage at 0.1 C, 4.35 V, and a cutoff current of 0.05 C and then discharged to 3 V at a constant current of 0.1 C. Thereafter, the battery was charged at a constant current and a constant voltage at 0.2 C, 4.35 V, and a cutoff current of 0.05 C and then discharged to 3 V at a constant current of 0.2 C. The charge and discharge at 0.2 C were repeated 3 times. This battery was used as a 300-mAh test battery.

High Load Test

An output characteristic test was performed using the test battery. After constant current-constant voltage charging at 0.2 C, 4.35 V, and a cutoff current of 0.05 C, constant current discharge was performed to 3 V at 0.2 C, and this capacity was recorded as a 0.2 C discharge capacity. Subsequently, after constant current-constant voltage charging at 0.2 C, 4.35 V, and a cutoff current of 0.05 C, constant current discharge was performed to 3 V at 5 C, and this capacity was recorded as a 5 C discharge capacity.

The 5 C discharge capacity retention ratio was calculated by the following equation:

5 C discharge capacity retention ratio=[5 C discharge capacity]/[0.2 C discharge capacity].

This treatment was performed on a total of three test batteries in a similar manner, and the average value of the 5 C discharge capacity retention ratios was taken as the output characteristic.

Cycle Characteristic Test

The test battery that had undergone the output characteristic test was subjected to constant current-constant voltage charging at 0.5 C, 4.35 V, and a cutoff current of 0.05 C, constant current discharge was performed to 3 V at 0.2 C, and this capacity was recorded as a first discharge capacity. The battery in this state was charged and discharged under the following conditions:

Charge: constant current-constant voltage charging at 1 C, 4.35 V, and cutoff current of 0.05 C; discharge: constant current discharging at 1 C and 3 V; measurement temperature: 25° C.; measurement was performed on a total of 3 test batteries, and the ratio of the 2000th discharge capacity based on the first discharge capacity, that is, the average value of the capacity retention ratio, was calculated and used as an index of cycle characteristics.

Example 1

Production of Battery Separator

A dispersion having an active ingredient rate of 60 wt % was provided by adding 100 parts by weight of particles A (barium sulfate (mirabilite method), D50=1.2 μm) shown in Table 1, 0.5 parts by weight of a polyacrylic acid dispersant ("ARON" (registered trademark) A6114 manufactured by Toagosei Co., Ltd.) (active ingredient), and water and performing dispersing with a bead mill.

To the resulting dispersion, 1.5 parts by weight of partially neutralized sodium salt of polyacrylic acid having a degree of neutralization of 50% (Viscomate NP-700 manufactured by Showa Denko K.K.) as a thickener, 5.0 parts by weight of an acrylic emulsion (Polysol AP-4735 manufactured by Showa Denko K.K.) as a binder (active ingredient), 0.5 parts by weight of a wetting agent (active ingredient) (trade name: "SN-WET 366" manufactured by San Nopco Ltd.), and water were added and stirred to produce a coating liquid having a solid content of 50 wt %.

The resulting coating liquid was applied to one surface (single surface) of a polyethylene porous membrane a (10 μm in thickness, "SETELA" (registered trademark) manufactured by Toray Industries, Inc.) shown in Table 2 by a microgravure method and dried to produce a battery separator including a 4 μm-thick heat-resistant porous layer.

The thickness of the heat-resistant porous layer, the content of hydrogen sulfide, the moisture ratio, the high load test and the cycle test of the battery, and the thermal shrinkage of the produced battery separator were evaluated, and the results were shown in Table 3.

Example 2 and Comparative Examples 1 to 5

A battery separator was produced and evaluated in a similar manner to that in Example 1 except that the particles A in Example 1 were changed to particles B to G shown in Table 1. Table 3 shows the results.

Examples 3 to 5 and Comparative Examples 6 and 7

A battery separator was produced and evaluated in a similar manner to that in Example 1 except that the one-surface coating and the film thickness of 4 μm of the heat-resistant porous layer of Example 1 were changed to the coated surface and the film thickness shown in Table 3. Table 3 shows the results.

Examples 6 and 7 and Comparative Examples 8 and 9

A battery separator was produced and evaluated in a similar manner to that in Example 1 except that the weight ratio of the active ingredient in the coating liquid of Example 1 was changed as shown in Table 3. Table 3 shows the results.

A battery separator was produced and evaluated in a similar manner to that in Example 1 except that the polyolefin porous membrane a of Example 1 was changed to a polyolefin porous membrane shown in Table 2. Table 3 shows the results.

Examples 8 to 10

The polyethylene micro-multi-dura mater of Example 1 was applied to one surface (single surface) of each of a polyethylene porous membrane b (15.8 μm in thickness, "SETELA" (registered trademark) manufactured by Toray Industries, Inc.), a polyethylene micro-multi-dura mater c (5.2 μm in thickness, "SETELA" (registered trademark) manufactured by Toray Industries, Inc.), and a polyethylene porous membrane d (14.5 μm in thickness, "SETELA" (registered trademark) manufactured by Toray Industries, Inc.) shown in Table 2 by a microgravure method and dried to provide a battery separator including a 4 μm-thick heat-resistant porous layer.

As is apparent from Table 3, the battery separators of Examples 1 to 10 exhibited good discharge characteristics of 65% or more in the high load test, exhibited good heat resistance of 5% or less in thermal shrinkage at 130° C., and exhibited good battery capacity retention ratio of 70% or more after 2000 cycles.

TABLE 1

| | | Average particle diameter D50 [μm] | BET specific area of particles [m²/g] | Proportion of particle diameter [%] | |
|---|---|---|---|---|---|
| | | | | 0.5 μm or less | 3.0 μm or more |
| Particles A | Barium sulfate (mirabilite method) | 1.2 | 2.1 | 3.5 | 5.1 |
| Particles B | Barium sulfate (mirabilite method) | 1.0 | 2.4 | 11 | 0.7 |
| Particles C | Barium sulfate (mirabilite method) | 0.7 | 2.9 | 31 | 0.1 |
| Particles D | Barium sulfate (mirabilite method) | 1.5 | 1.6 | 1.5 | 12 |

TABLE 1-continued

|  | | Average particle diameter | BET specific area of particles | Proportion of particle diameter [%] | |
|---|---|---|---|---|---|
|  |  | D50 [μm] | [m²/g] | 0.5 μm or less | 3.0 μm or more |
| Particles E | Barium sulfate (barite powder) | 1.0 | 3.0 | 18 | 9.0 |
| Particles F | α-Alumina | 1.2 | 4.6 | 4.0 | 3.2 |
| Particles G | Silica | 1.1 | 3.1 | 5.0 | 5.3 |

TABLE 2

|  | Thickness of separator [μm] | Air resistance [sec/100 cm³ Air] | Porosity [%] | Thermal shrinkage [%] | | Tensile strength [kgf/cm2] | | Elongation at break [%] | |
|---|---|---|---|---|---|---|---|---|---|
|  |  |  |  | MD | TD | MD | TD | MD | TD |
| Porous membrane a | 10.0 | 80 | 48.0 | 15.2 | 26.4 | 1158 | 1134 | 121 | 101 |
| Porous membrane b | 15.8 | 195 | 46.6 | 18.5 | 23.2 | 1629 | 2149 | 163 | 115 |
| Porous membrane c | 5.2 | 45 | 33.2 | 20.8 | 18.4 | 1963 | 2436 | 97 | 71 |
| Porous membrane d | 14.5 | 230 | 38.5 | 13.9 | 18.8 | 1350 | 1145 | 140 | 191 |

TABLE 3-1

|  |  | Weight ratio of active ingredients | | | | | Volume fraction of particles (%) | Polyethylene porous membrane | Surface coated with heat-resistant porous layer, film thickness (μm) | |
|---|---|---|---|---|---|---|---|---|---|---|
|  | Particle type | Particles | Dispersant | Thickener | Binder | Wetting agent |  |  | 1 surface | 2 surface |
| Example 1 | A | 100 | 0.5 | 1.5 | 4 | 0.5 | 79.7 | a | 4.0 | 0 |
| Example 2 | B | 100 | 0.5 | 1.5 | 4 | 0.5 | 79.7 | a | 4.0 | 0 |
| Comparative Example 1 | C | 100 | 0.5 | 1.5 | 4 | 0.5 | 79.7 | a | 4.0 | 0 |
| Comparative Example 2 | D | 100 | 0.5 | 1.5 | 4 | 0.5 | 79.7 | a | 4.0 | 0 |
| Comparative Example 3 | E | 100 | 0.5 | 1.5 | 4 | 0.5 | 79.7 | a | 4.0 | 0 |
| Comparative Example 4 | F | 100 | 0.5 | 1.5 | 4 | 0.5 | 81.5 | a | 4.0 | 0 |
| Comparative Example 5 | G | 100 | 0.5 | 1.5 | 4 | 0.5 | 88.9 | a | 4.0 | 0 |
| Example 3 | A | 100 | 0.5 | 1.5 | 4 | 0.5 | 79.7 | a | 2.2 | 0 |
| Example 4 | A | 100 | 0.5 | 1.5 | 4 | 0.5 | 79.7 | a | 7.5 | 0 |
| Example 5 | A | 100 | 0.5 | 1.5 | 4 | 0.5 | 79.7 | a | 3.1 | 3.1 |
| Comparative Example 6 | A | 100 | 0.5 | 1.5 | 4 | 0.5 | 79.7 | a | 1.8 | 0 |
| Comparative Example 7 | A | 100 | 0.5 | 1.5 | 4 | 0.5 | 79.7 | a | 5.5 | 5.5 |
| Example 6 | A | 100 | 0.5 | 1.5 | 8 | 0.5 | 71.0 | a | 4.0 | 0 |
| Example 7 | A | 100 | 0.1 | 0.1 | 0.5 | 0.1 | 97.0 | a | 4.0 | 0 |
| Comparative Example 8 | A | 100 | 0.5 | 1.5 | 10 | 0.5 | 67.4 | a | 4.0 | 0 |
| Comparative Example 9 | A | 100 | 0.1 | 0.1 | 0.1 | 0.1 | 98.5 | a | 4.0 | 0 |
| Example 8 | A | 100 | 0.5 | 1.5 | 4 | 0.5 | 79.7 | b | 4.0 | 0 |
| Example 9 | A | 100 | 0.5 | 1.5 | 4 | 0.5 | 79.7 | c | 4.0 | 0 |
| Example 10 | A | 100 | 0.5 | 1.5 | 4 | 0.5 | 79.7 | d | 4.0 | 0 |

TABLE 3-2

| | Physical properties of separator | | | | | | Physical properties of prototype battery cell | |
|---|---|---|---|---|---|---|---|---|
| | Hydrogen sulfide content | Moisture ratio | Air resistance [sec/100 cm³ Air] | Electrical resistance [ohm.cm²] | Thermal shrinkage at 130° C. [%] | | High load test | Capacity retention ratio at 2000 cycles |
| | [mg/m²] | [ppm] | | | MD | TD | 5 C/0.2 C | |
| Example 1 | <0.1 × 10⁻³ | 220 | 105 | 1.20 | 2.8 | 2.0 | 71% | 74% |
| Example 2 | <0.1 × 10⁻³ | 250 | 110 | 1.23 | 2.5 | 1.9 | 69% | 73% |
| Comparative Example 1 | <0.1 × 10⁻³ | 430 | 119 | 1.12 | 2.1 | 1.5 | 61% | 61% |
| Comparative Example 2 | <0.1 × 10⁻³ | 250 | 102 | 1.21 | 8.5 | 7.0 | 70% | 69% |
| Comparative Example 3 | 0.31 | 250 | 170 | 1.35 | 3.0 | 2.8 | 70% | 0% |
| Comparative Example 4 | <0.1 × 10⁻³ | 850 | 120 | 1.25 | 2.7 | 2.0 | 67% | 55% |
| Comparative Example 5 | <0.1 × 10⁻³ | 1800 | 115 | 1.90 | 2.6 | 2.4 | 65% | 0% |
| Example 3 | <0.1 × 10⁻³ | 118 | 97 | 0.98 | 4.5 | 4.0 | 73% | 74% |
| Example 4 | <0.1 × 10⁻³ | 302 | 111 | 1.29 | 1.8 | 1.5 | 66% | 71% |
| Example 5 | <0.1 × 10⁻³ | 233 | 109 | 1.28 | 0.5 | 0.5 | 68% | 70% |
| Comparative Example 6 | <0.1 × 10⁻³ | 147 | 93 | 0.89 | 15.5 | 15.0 | 72% | 74% |
| Comparative Example 7 | <0.1 × 10⁻³ | 488 | 260 | 2.50 | 0.4 | 0.4 | 62% | 68% |
| Example 6 | <0.1 × 10⁻³ | 220 | 141 | 1.31 | 2.7 | 2.1 | 68% | 70% |
| Example 7 | <0.1 × 10⁻³ | 220 | 103 | 1.09 | 1.2 | 1.1 | 74% | 72% |
| Comparative Example 8 | <0.1 × 10⁻³ | 306 | 280 | 2.90 | 4.7 | 4.9 | 61% | 59% |
| Comparative Example 9 | (Production failed) | — | — | — | — | — | — | — |
| Example 8 | <0.1 × 10⁻³ | 215 | 212 | 1.23 | 3.0 | 2.5 | 69% | 71% |
| Example 9 | <0.1 × 10⁻³ | 275 | 70 | 0.83 | 1.0 | 0.9 | 73% | 70% |
| Example 10 | <0.1 × 10⁻³ | 270 | 250 | 1.59 | 2.9 | 2.0 | 66% | 71% |

INDUSTRIAL APPLICABILITY

Our separators can be suitably used as a battery separator that is preferably used for a nonaqueous electrolyte battery such as a lithium ion battery.

The invention claimed is:

1. A battery separator comprising:
a polyolefin porous membrane; and
a heat-resistant porous layer provided on at least one surface of the porous membrane,
wherein the heat-resistant porous layer contains barium sulfate particles and an organic synthetic resin component,
the barium sulfate particles contain 20% by volume or less of particles having a particle diameter of 0.5 μm or less and 10% by volume or less of particles having a particle diameter of 3.0 μm or more,
the heat-resistant porous layer contains 70% by volume or more and 98% by volume or less of the barium sulfate particles when the total of the barium sulfate particles and the organic synthetic resin component is taken as 100% by volume,
an average thickness of the heat-resistant porous layer is 2 μm or more and 10 μm or less,
a moisture ratio of the separator is 400 ppm or less, and
a content of hydrogen sulfide in the separator is $0.2 \times 10^{-3}$ mg/m² or less.

2. The battery separator according to claim 1, wherein the barium sulfate particles are precipitated barium sulfate.

3. The battery separator according to claim 2, wherein the precipitated barium sulfate is produced by a mirabilite method using barium chloride as a raw material.

4. The battery separator according to claim 1, wherein the barium sulfate particles have a BET specific surface area of 2.0 m²/g or more and less than 3.0 m²/g.

5. The battery separator according to claim 1, wherein the organic synthetic component contains one or more selected from the group consisting of a (meth)acrylate copolymer resin, a polyacrylamide resin, a polyvinylidene fluoride resin, a polyvinyl alcohol resin, a polyimide resin, a polyamideimide resin, and a polyamide resin.

6. The battery separator according to claim 1, wherein the polyolefin porous membrane has an air resistance of 30 sec/100 cm³ Air or more and 200 seconds/100 cm³ or less.

* * * * *